Patented Mar. 12, 1946

2,396,298

UNITED STATES PATENT OFFICE 2,396,298

LUMINESCENT MATERIAL AND PROCESS OF PREPARING THE SAME

Mark Swanson, Washington, D. C.

No Drawing. Application September 10, 1936, Serial No. 100,178

4 Claims. (Cl. 252—301.6)

(Granted under the act of March 3, 1883, as amended April 30, 1928; 370 O. G. 757)

This invention relates to a substance that will become luminescent when properly excited or irradiated and is practically free of time lag in response to stimulation and shows no perceptible persistence upon cessation of the stimulus.

It is the object of this invention to provide a material of the type above specified that will be particularly adapted for use where the change in stimulus varies rapidly, for example, when it is employed to indicate the rapid relative movement of the source of stimulation.

All luminescent substances that have heretofore been obtainable by me have shown a delay in response between the time of a change in stimulus and the resulting alteration of the degree of luminescence. In cases where the factor causing the change in stimulus is moving rapidly over the luminescent surface there is delay in indicating the position thereof and also there is persistence of luminescence after the factor has begun to affect another portion of that surface. For example, if the stimulus be a spot of light that is moving over the surface the effect of undue persistence is to prolong the spot into a line. I have found that when a material prepared according to the present invention is activated it shows practically instantaneous infra-red response both to stimulation and to cessation thereof.

The substance having the desirable quality of immediate response, according to the present invention, is a sulphide of zinc or of an alkaline earth metal in which the activating impurity is a small fraction of 1% of either manganese or regnium or both together. No doubt masurium, which falls between manganese and rhenium in the periodic table of elements, will show the same desirable characteristics but that element has not been isolated. In the description that follows, it is to be understood that all the substances used are to be of an extremely high degree of purity, otherwise the contaminating elements would cause a time lag of response or so mask the practically instantaneous action of infra-red upon the luminescence resulting from the metals intended to be the activating inclusion.

One way of preparing a luminescent material having the desired properties is to add to the sulphide the requisite percentage of manganese or rhenium in the form of a salt of the element and heat the mass to incandescence in the presence of a suitable concentration of a binding flux such as sodium chloride.

From a practical standpoint, results are more easily duplicated by a different method of preparation in which the metallic impurity and the binding flux are added to the pure zinc solution before precipitation, and in which the proper conditions for precipitation are determined by running test blanks that are carried through to the final product and are then examined to ascertain which of the blanks has the most desirable characteristics. For example, half a kilogram of very pure zinc chloride is dissolved in 250 cc. of pure distilled water and filtered. The clear solution is made ammoniacal and permitted to stand undisturbed for about 24 hours, after which the insoluble precipitate is filtered off and the clear solution diluted with 4.5 liters of pure distilled water.

This serves as a stock solution to which is added 60 cc. of an aqueous solution containing six grams of sodium chloride and 40 cc. of an aqueous solution containing 400 mg. of manganous chloride, per liter of stock solution. These are average values and may be varied somewhat. A number of test blanks of this stock solution containing say, 25 cc., are then treated with a clear filtered solution of a suitable sulphide, preferably an aqueous solution of ammonium sulphide. Sufficient of the sulphide is added to bring down nearly all of the zinc in the first blank and greater and uniformly increasing quantities of the sulphide are used in the other blanks, and except for the first an excess of sulphide is used. To each blank, the sulphide is added with vigorous stirring and immediately following half a liter of pure distilled water at about 100° C. is added and the stirring continued for a minute or two. The zinc sulphide precipitate settles rapidly and after an hour or so the clear supernatant liquid is removed by decanting or suction and the sulphide placed in filters to remove the excess water. The sulphide is then dried at 100° C., finely powdered and heated for approximately 15 minutes at a temperature of about 1020° C. in an atmosphere of pure dry nitrogen containing a little sulphur or carbon disulphide vapour.

Sub-blanks may be run to determine the optimum temperature and time of heating as these factors may vary somewhat in different batches. The products of the these blanks are then activated with ultra-violet light and the nature of their response determined by subjecting the material to infra-red light which intensifies the luminescence. The bulk of the stock solution may then be treated by the same process as was used on the blank producing the most desirable results.

It should be noted that zinc sulphide precipitated as above described does not show an appreciable intensity of luminescence even under intense excitation, it being known that the greatest intensity is obtained when only about half of the zinc in the solution is precipitated, but where the material is to be employed for the detection of infra-red light the product obtained by the above described process is far superior. It is to be understood that a suitable salt of rhenium may be used instead of the manganous chloride above mentioned, or a portion of the last named salt may be replaced by the rhenium compound.

In their individual roles, which are complex and therefore difficult to define exactly, the metallic activating impurities, manganese and rhenium, contribute that very desirable increasing luminescent characteristic under exposure to infra-red rays; the binding flux contributes an important secondary effect in determining sensitivity and, in varying concentrations is closely related to the time and temperature for calcination, and in some instances influences the color and brightness of luminescence. With these factors constant, the effect of variations in the time and temperature upon both the monochromatic and homogeneous infra-red sensitivity is pronounced. It is apparent then that variations in preparing this sensitive sulphide can produce characteristic results and therefore the method given is empirical and represents a method for obtaining them.

The above described product gives forth a dull reddish glow that is little mort than perceptible when irradiated by long wave length ultra-violet light, the effect of infra-red light thereon being to change it to a very bright yellowish or whitish-yellow light, and the response to the infra-red is practically instantaneous both as to the beginning and the termination of the stimulus by infra-red light.

This invention may be manufactured and used by or for the Government of the United States of America for governmental purposes without payment of royalties thereon or therefor.

I claim:

1. A process for preparing luminescent material, which comprises the following steps: dissolve 500 grams of zinc chloride in 250 cc. distilled water, filter, make ammoniacal, permit to stand twenty-four hours undisturbed, filter, add to filtrate four and one-half liters of distilled water; then for each liter of solution add 60 cc. of aqueous solution containing 6 grams sodium chloride and 40 cc. aqueous solution containing 400 milligrams manganous chloride; then add with vigorous stirring sufficient clear filtered solution of a suitable sulphide to bring down the zinc and manganese, then add immediately twice as much water at 100° C. as the volume of the solution and stir a minute or two, separate the precipitate, dry at 100° C., powder finely, then heat fifteen minutes at 1020° C. in an atmosphere of nitrogen containing a small quantity of sulphur or carbon disulphide vapor, all of the materials being highly pure and the product being characterized by practically instantaneous response to changes in infra-red stimulation.

2. A process for preparing luminescent material which comprises the following steps: dissolve zinc chloride in distilled water, filter, make ammoniacal, and permit to stand undisturbed to precipitate metals other than zinc as hydroxides, filter, dilute with distilled water, add aqueous solution of sodium chloride and manganous chloride; add with vigorous stirring sufficient clear filtered solution of a suitable sulphide to bring down the zinc and manganese, add immediately twice as much water at 100° C. as the volume of the solution and stir, separate the precipitate, dry, powder finely, and heat fifteen minutes at 1020° C. in an atmosphere of nitrogen containing a small quantity of sulphur or carbon disulphide vapor, all of the materials being highly pure and the product being characterized by practically instantaneous response to changes in infra-red stimulation.

3. A process for preparing luminescent material which comprises the following steps: dissolve zinc chloride in distilled water, filter, make ammoniacal, and permit to stand undisturbed to precipitate metals other than zinc as hydroxides, filter, dilute with distilled water, add aqueous solution of sodium chloride and manganous chloride; add with vigorous stirring sufficient clear filtered solution of a suitable sulphide to bring down the zinc and manganese, add immediately twice as much water at 100° C. as the volume of the solution and stir, separate the precipitate, dry, powder finely, and heat fifteen minutes at 1020° C. in a non-oxidizing atmosphere, the product being characterized by practically instantaneous response to infra-red stimulation.

4. A process for preparing luminescent material which comprises the following steps: dissolve zinc chloride in distilled water, filter, make ammoniacal, and permit to stand undisturbed to precipitate metals other than zinc as hydroxides, filter, dilute with distilled water, add aqueous solution of sodium chloride and manganous chloride; add with vigorous stirring sufficient clear filtered solution of a suitable sulphide to bring down the zinc and manganese, add boiling water immediately, separate the precipitate, dry, and powder finely.

MARK SWANSON.